July 19, 1966  J. M. STRANG  3,261,260
VIBRATION COMPENSATED OPTICAL VIEWING SYSTEM
Filed May 10, 1956 5 Sheets-Sheet 1

Inventor
*John Martin Strang*
By
*Mason, Fenwick & Lawrence*
Attorneys

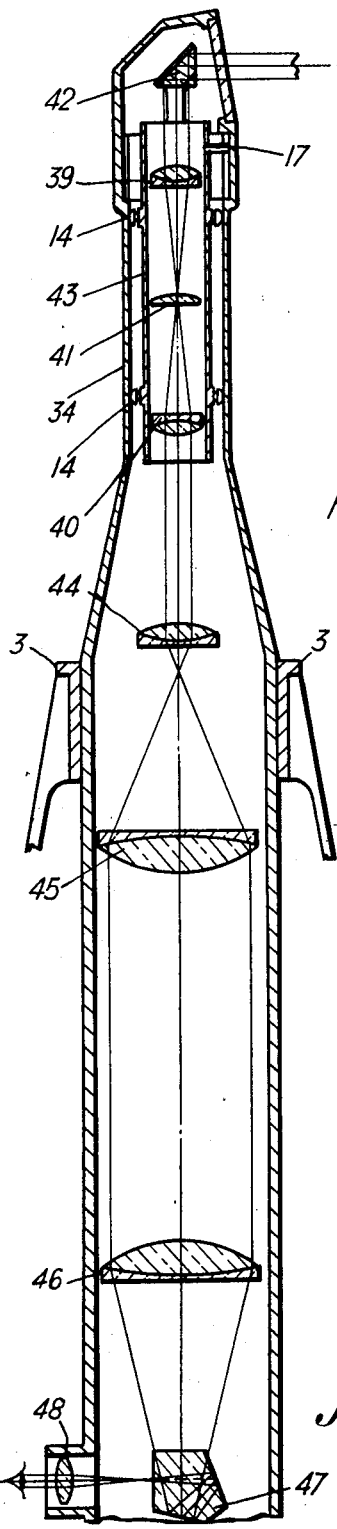

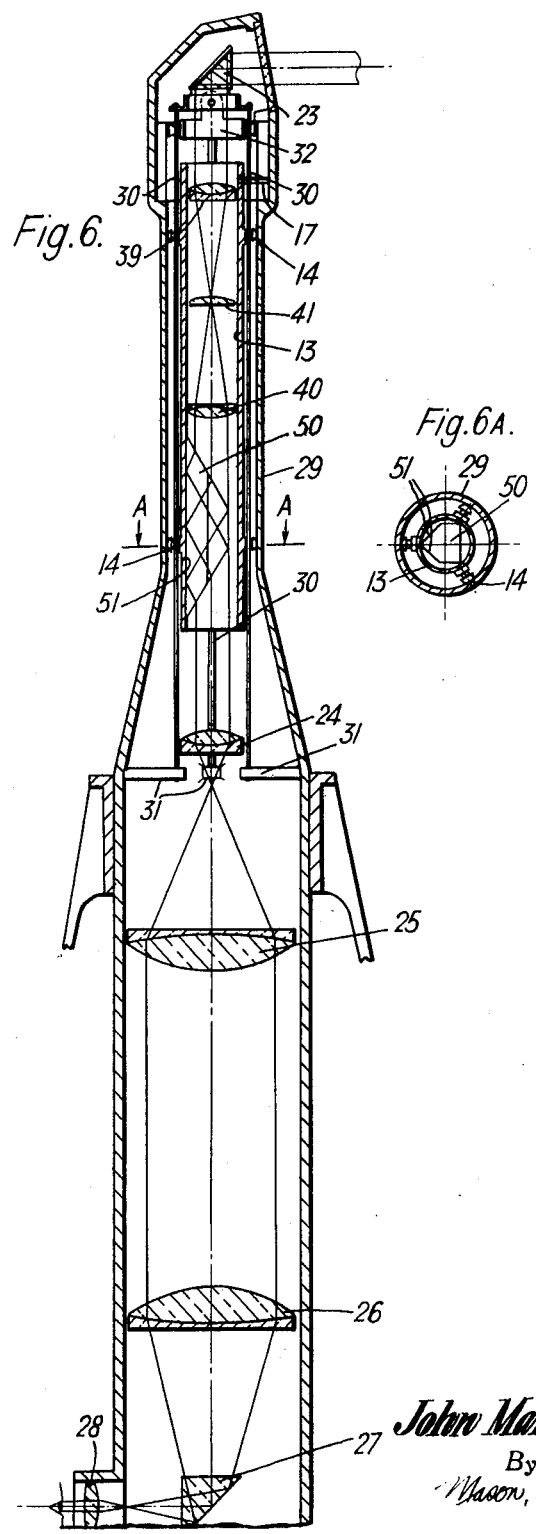

United States Patent Office 3,261,260
Patented July 19, 1966

3,261,260
VIBRATION COMPENSATED OPTICAL
VIEWING SYSTEM
John Martin Strang, Anniesland, Glasgow, Scotland, assignor to Barr & Stroud Limited, Anniesland, Glasgow, Great Britain, a British company
Filed May 10, 1956, Ser. No. 584,142
8 Claims. (Cl. 88—72)

This invention relates to optical viewing instruments and more particularly to periscopes.

In some optical viewing instruments, such as submarine periscopes, disturbing movements of the image viewed by the observer are caused by bending of the casing or part of the casing of the instrument. Such bending may be caused by vibration imparted to the instrument by the vibration of the vessel carrying the instrument, or by the passage of the instrument through a surrounding medium such as sea water.

It is an object of the invention to obviate or mitigate such movements of the image.

According to the invention I provide an optical viewing instrument, for example a periscope, having a telescope system within a casing which casing is subject to bending thereat, comprising a substantially rigid carrier mounted within said casing and carrying said telescope system, said telescope system being of unit magnification and non-inverting, means mounting said carrier in said casing so that bending of the casing causes tilting of the rigid carrier and parts carried thereby as a unit without bending, whereby movement of the image transmitted by the telescope due to bending of the casing is substantially eliminated.

Said telescope system on the carrier may comprise two lenticular telescopes in series giving an overall magnification of unity and non-inverting, one telescope thus acting as means for compensating the beam passing through the other telescope for change in direction between entrance thereto and emergence therefrom. The two lenticular telescopes may be of different magnifications, provided however, that the overall magnification of the system is unity.

In another arrangement said telescope system may comprise a prismatic telescope whose lenticular system is of unit magnification and inverting and is combined with an inverting prism.

The non-bending but tilting movement of a telescope system as described avoids imparting angular movement to the beam emerging from the system, and hence does not impart movement to the image viewed by the eyepiece of the instrument.

Normally, especially as applied to periscopes, there is a second optical system mounted in a non-bending part of said casing and adapted to receive the beam from said telescope system and form an image at the eye piece of the instrument.

With an instrument, for viewing in a direction normal to the axis of the instrument, for which purpose a prism is necessary at the entrance pupil end of the instrument, provision may be made to compensate for movement of the image due to tilting of the prism caused by bending of the casing of the instrument. This can be accomplished by constructing the prism in the form of a doubly reflecting prism. Tilting of the prism in the plane of sight will then cause no movement of the image in that plane.

In other examples where it is necessary to use a singly reflecting prism, provision may be made to stabilize the prism, say by wires attached to a portion of the instrument casing which does not bend. By this means the prism is fixed (angularly) relative to the axis of the instrument and, thus, movement of the image due to the prism is eliminated.

The stabilizing of the prism can, alternatively, be effected by a control connection between said rigid carrier and the prism holder. As the carrier does not bend and the outer casing bends in a curve, relative movement occurs between the end of the carrier and that portion of the casing carrying the prism. This movement is used to impart a correcting rotation to the prism to maintain it in a stabilised position.

Embodiments of the invention will now be described, by way of example, with reference to the accompanying diagrammatic drawings, in which:

FIGS. 2, 3, 4, 5 and 6 are similar views showing various types of periscopes; and FIG. 3A is a fragmentary sectional elevation of the periscope shown in FIG. 3.

FIG. 6A is a sectional view on the line A—A of FIG. 6.

Figure 1:
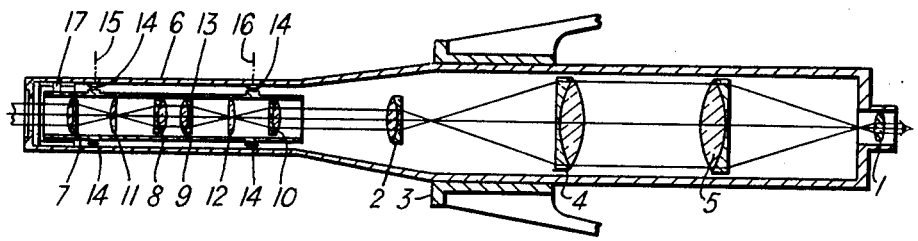
FIG. 1 is a central sectional elevation of an optical instrument for axial viewing.

FIG. 1 shows an instrument for observing axially on a distant object. The observer views the image of the distant object by means of eyepiece 1, the image being formed by objective lens 2. The support 3 of the instrument is sufficiently near the lens 2 to ensure that lens 2 does not move appreciably on vibration. Similarly the eyepiece 1 and objective lenses 4 and 5 are rigid and not affected by vibration. The portion 6 of the casing, which is free at the end as with a cantilever and is subject to bending as a result of vibration, is of reduced diameter and overhangs beyond the instrument support 3.

Under the invention the objective lenses 7, 8, 9 and 10 and collector lenses 11 and 12 form a non-inverting telescope of unit magnification.

The light entering lens 7 from the distant object is parallel and that emerging from lens 10 is also parallel. The focal lengths of the lenses are arranged so that the overall magnification of the lenses 7 to 12 is unity and noninverting or positive. The lenses 7, 11 and 8 form one telescope of unit magnification and inverting with parallel light emerging from lens 8, while the lenses 9, 12 and 10 form a second telescope of unit magnification and inverting.

The lenses 7 to 12 are carried on a substantially rigid metal carrier or frame 13, which is supported within the part 6 of the outer casing by two sets of three domed feet 14 in the transverse planes 15 and 16. The domed feet 14 are preferably so curved that the surfaces of the feet form parts of a sphere. A pin 17 is fixed in the outer casing and passes through an aperture in the frame 13, the pin having a sliding fit therein. If the casing part 6 bends in a curve, as usually happens on vibration, the frame 13 does not bend but merely tilts. As the lenses in the frame form a unit noninverting telescope, no angular movement is imparted by the tilting to the beam emerging from lens 10 and, therefore, there is no movement imparted to the image viewed by the eyepiece 1.

In the drawings, corresponding parts in the various figures are marked with corresponding numerals.

Figure 2:
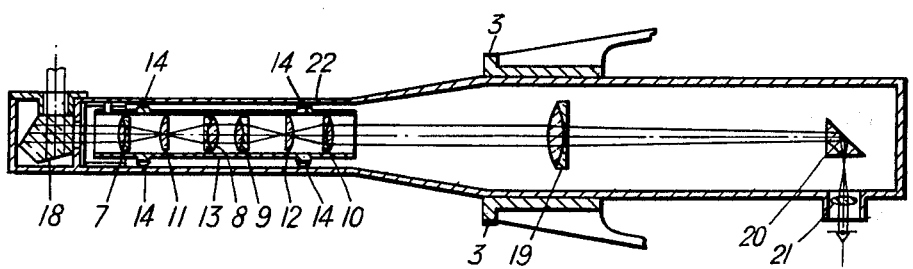

FIG. 2 shows a periscope in which the observer looks in at right angles to the axis of the periscope, and the object is viewed also at right angles to the axis. The light from the object is received by pentagonal (doubly reflecting) prism 18 by which it is directed along the axis through lenses 7 to 12 and objective lens 19, and reflecting prism 20 directs the light to eyepiece 21. The lenses 7 to 12 in the small diameter portion 22 of the casing are mounted in rigid frame 13. The prism 18 is carried on the outer casing and, therefore, is subject to movements at right angles to the axis due to bending of the casing, but as this prism is doubly reflecting, these movements have no angular effect in the plane of sight on the beam passing through the prism.

Figure 3:
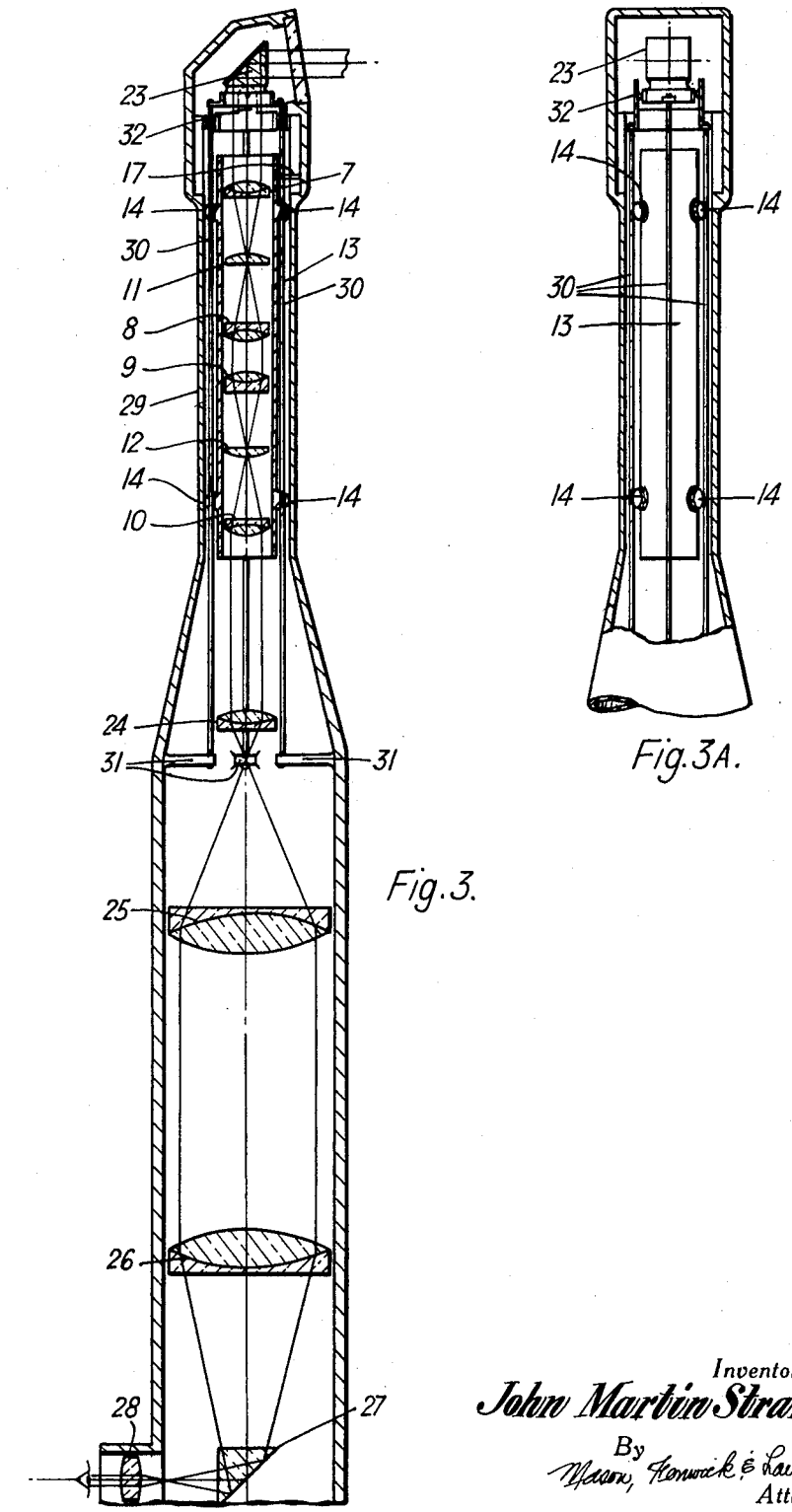

FIGS. 3 and 3A show a periscope in which entrance prism 23 is singly reflecting and directs incoming light through lenses 7 to 12 and objective lenses 24, 25 and 26. The light is then reflected by prism 27 to eyepiece 28. Such a prism as 23 is necessary if scanning in the plane of sight is desired. If prism 23 were allowed to move on bending of part 29 of the casing, an angular movement of the emergent beam would be caused and that would cause the final image to move. To prevent this angular movement, the prism is stabilised by means of four wires 30 which are attached to four inwardly extending arms 31 mutually at 90° and fixed to the casing. The arms 31 do not move on vibration. The prism 23 is carried on a gimbal mounting 32 whose disposition is controlled by the wires 30. The wires 30 form, in effect, sides of parallelograms and, therefore, the cross members of the parallelograms remain parallel for all small movements caused by the bending. Thus, the prism 23 maintains a constant angular disposition in the plane of sight relative to the axis of the periscope and no angular movement is imparted in that plane to the beam emerging from the prism 23. Similarly, the wires 30 stabilise the prism in the plane at right angles to that of the line of sight.

Figure 4:
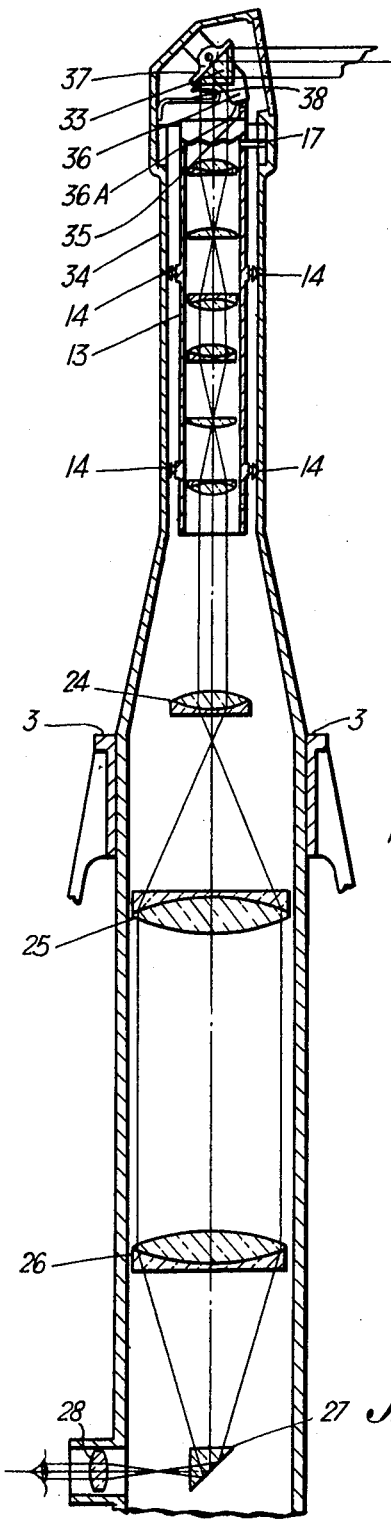

FIG. 4 shows a further form of periscope in which entrance prism 33 is singly reflecting. In this case stabilisation of the prism 33 in the line of sight is obtained from the relative movement between outer casing 34 and the inner frame 13. This is accomplished by means of a projection 35 attached to the frame 13, and the inclined or cam face 36A of lug 36 attached to the holder 37 of the prism 33. When, due to bending, the inner frame 13 moves relatively to the casing 34, the relative movement between parts 35 and 36 causes the prism to tilt. By adjusting the form of the cam face 36A the necessary correction can be obtained for the line of sight. The face 36A is held against the projection 35 by pressure from spring 38.

FIG. 5 shows a periscope in which the unit telescope consists of a single lenticular telescope composed of objective lenses 39 and 40 and collector lens 41, combined with a singly reflecting prism 42. In this case the prism 42 is rigidly attached to inner frame 43. This combination has the property of unit noninverting magnification in the plane of sight and, therefore, the effect of bending in the top portion is eliminated in the plane of sight.

Light from lens 40 passes through objective lenses 44, 45 and 46 to pentagonal prism 47 which reflects the light to eyepiece 48.

In a modification, the pin 17 is omitted and one set of bearings 14 is replaced by a thin disc which is mounted in a recess in the inner wall of the casing. The wall of such a recess forms part of a sphere. Means are provided to prevent relative rotation between the frame 43 and casing 34.

In FIGS. 6 and 6A the entrance prism 23 is mounted as in FIG. 3, while the unit prismatic telescope mounted on frame 13 comprises lenses 39, 40, 41 and inverting prism 50 in which the rays are refracted on to roof surfaces 51 (FIG. 6A) and which gives inversion in two planes, so that the whole frame unit comprises a non-inverting telescope of unit magnification.

I claim:

1. An optical viewing instrument comprising an elongated casing having entrance and viewing ends, supporting means rigidly supporting said casing at a point intermediate said ends, said casing having a bendable portion between said supporting means and said entrance end which is free and subject to bending, a telescope system having a plurality of optical elements supported within said casing in axially spaced relation including an ocular lens system mounted within said viewing end and an optical element at said entrance end for directing light rays toward said ocular lens system, said optical element including a noninverting correction system of optical elements forming a system of unit magnification mounted within said bendable portion of said casing for receiving image-forming light and transmitting emergent rays along a selected axis to said ocular lens system, said correction system comprising a plurality of axially spaced and aligned lenses, a substantially rigid elongated carrier member within said bendable casing portion supporting all of the optical elements of said correction system in rigid alignment with each other during bending of said bendable casing portion, and mounting means supporting said carrier member and correction system on said bendable casing portion and disposed at a plurality of axially spaced positions for tilting the carrier member and its supported optical elements as a unit relative to the normal axis thereof upon bending of said bendable casing portion to continuously substantially maintain the emergent rays from said correction system against angular movement relative to said selected axis.

2. An optical viewing instrument comprising an elongated casing having entrance and viewing ends, an ocular lens system mounted within said viewing end of the casing, an optical part at said entrance end for directing light rays to said ocular lens system, supporting means rigidly supporting said casing at a point intermediate said ends, said casing having a bendable portion between said supporting means and said entrance end which is free and subject to bending, a noninverting correction lens system of unit magnification mounted wholly within said bendable portion of said casing intermediate said optical part and said ocular lens system interposed in the path of the rays directed from said optical part to transmit emergent rays along a selected axis to said ocular lens system, said correction lens system comprising a plurality of axially spaced and aligned lenses, a substantially rigid elongated carrier member within said bendable casing portion supporting all of the lenses of said correction system in rigid alignment with each other during bending of said bendable casing portion, and mounting members supporting said carrier member and correction lens system on said bendable casing portion and disposed at a plurality of axially spaced positions for tilting the carrier member and its supported lenses as a unit relative to the normal axis thereof upon bending of said bendable casing portion to continuously substantially maintain the emergent rays from said correction lens system against angular movement relative to said selected axis.

3. In an optical viewing instrument, the combination recited in claim 2 wherein said correction lens system comprises two axially spaced and aligned inverting lens systems.

4. In an optical viewing instrument, the combination recited in claim 2, wherein said mounting members comprise two sets of spacing feet interspaced axially of the casing, projecting radially outwardly from said carrier member and bearing on the interior of the casing.

5. An optical viewing instrument comprising an elongated casing having entrance and viewing ends, an ocular lens system mounted within said viewing end of the casing, an optical part at said entrance end for directing light rays to said ocular lens system, supporting means rigidly supporting said casing at a point intermediate said ends, said casing having a bendable portion between said supporting means and said entrance end which is free and subject to bending, a noninverting correction lens system of unit magnification mounted wholly within said bendable portion of said casing intermediate said optical part and said ocular lens system interposed in the path of the rays directed from said optical part to transmit emergent rays along a selected axis to said ocular lens system, said correction lens system comprising a plurality of axially spaced and aligned lenses, a substantially rigid elongated carrier member within said bendable casing portion supporting all of the lenses of said correction system in rigid alignment with each other along a common axis during bending of said bendable casing portion, and mounting members supporting said carrier member and correction lens system on said bendable casing portion and disposed in two planes interspaced axially of the carrier member and engaging the casing at points positioning the common axis of the lenses of said correction lens system along a tilted axis in response to bending of said outer casing portion to displace the axis of the emergent rays laterally of the axis of rays incident to said correction lens system to continuously substantially maintain the emergent ray axis against angular movement relative to said selected axis.

6. A periscope comprising an elongated casing having entrance and viewing ends, an ocular lens system mounted within said viewing end of the casing, a prism mounted in said casing at said entrance end for receiving incoming rays and directing them to said ocular lens system, supporting means rigidly supporting said casing at a point intermediate said ends, said casing having a bendable portion between said supporting means and said entrance end which is free and subject to bending, a non-inverting correction lens system of unit magification located wholly within said bendable portion of said casing intermediate said prism and said ocular lens system interposed in the path of the rays directed from said prism to transmit emergent rays along a selected axis to said ocular lens system, said correction lens system comprising a plurality of axially spaced and aligned lenses, a substantially rigid elongated carrier member within said bendable casing portion supporting all of the lenses of said correction lens system in rigid alignment with each other during bending of said bendable casing portion, and mounting members supporting said carrier member and correction lens system on said bendable casing portion and disposed at a plurality of axially spaced positions for tilting the carrier member and its supported lenses as a unit relative to the normal axis thereof upon bending of said bendable casing portion to continuously substantially maintain the emergent rays from said correction lens system against angular movement relative to said selected axis.

7. In a periscope, the combination recited in claim 6 wherein said casing includes a stationary part in the zone of said supporting means, and means are provided for supporting said prism from said stationary part of the casing independently of said carrier member for maintaining a substantially constant angular disposition of the prism relative to the normal axis of the periscope.

8. In a periscope, the combination recited in claim 6, including means pivotally supporting said prism from said casing, a cam follower rigidly fixed to said prism and extending therefrom, and said carrier member having a cam surface on an end thereof adjacent said prism bearing against said cam follower for imparting a compensating tilting movement to the prism about its pivotal axis upon tilting of the carrier member responsive to bending of the bendable casing portion to maintain a substantially constant angular disposition of the prism relative to the normal axis of the periscope.

References Cited by the Examiner

UNITED STATES PATENTS

| 749,755 | 1/1904 | Spear | 88—69 |
|---|---|---|---|
| 1,097,635 | 5/1914 | Humbrecht | 88—72 |
| 1,270,876 | 7/1918 | Saegmuller | 88—72 |
| 1,290,746 | 1/1919 | Hollander | 88—69 |
| 1,311,846 | 7/1919 | Chretien | 88—32 |
| 1,521,339 | 12/1924 | Taylor. | |
| 2,441,036 | 5/1948 | Schade | 88—32 |
| 2,488,239 | 11/1949 | Rattray | 88—72 |
| 2,523,577 | 9/1950 | Laverdure | 88—72 X |

FOREIGN PATENTS

| 645,340 | 6/1928 | France. |
|---|---|---|

JEWELL H. PEDERSEN, *Primary Examiner.*

SAMUEL BOYD, ARTHUR M. HORTON, *Examiners.*

D. D. DOTY, P. G. BETHERS, R. L. WIBERT, *Assistant Examiners.*